UNITED STATES PATENT OFFICE 2,487,106

COMPOSITION CAPABLE OF BEING MOLDED AND BEING CAST INTO FILMS

Ralph Thomas Kline Cornwell, Rosemont, Pa., assignor to American Viscose Corporation, Wilmington, Del., a corporation of Delaware No Drawing. Application July 17, 1947, Serial No. 761,738

13 Claims. (Cl. 106—178)

This invention relates to compositions comprising an organic plastic or film-forming material plasticized with certain N-derivatives of the amides of aliphatic dicarboxylic acids.

Plastic compositions such as cellulose ester or ether plastics and phenol aldehyde, amine aldehyde, and alkyd resins frequently require a placticizer or softener to render them less brittle and more easily workable. Plasticizers or softeners are also used in lacquers and varnishes for imparting the desired flexibility to the films formed therefrom. Many substances have been proposed as plasticizers, one of the principal classes being esters.

Plasticizers are also employed in heat-sealing coating compositions in order to reduce the temperature at which the film ordinarily softens. Such coatings, for example, have found application upon films used in packaging foodstuffs and other materials which require moisture-impervious and air-impervious wrappers. Coated regenerated cellulose film of this type has proved quite valuable. However, comparatively few plasticizers heretofore available for such heat-sensitive coatings have reduced the softening point of the coating to a low enough temperature without making the coating sticky at room temperature or under 50° C. On the other hand, coatings which do not seal at temperatures between 80° C. and 120° C. are not desirable upon cellophane because of the excessive heat required to fuse the contiguous surfaces.

Now, in accordance with this invention, plasticizers are prepared which reduce the softening point of heat-sensitive compositions to a temperature which permits their use on regenerated cellulose film without forming a tacky film at storage temperatures.

The plasticizers of this invention are formed by the reaction of an aliphatic dicarboxylic acid or its anhydride with either of hydroxyl primary amine ($H_2N.R.OH$) or a hydroxyl secondary amine ($HN-(ROH)_2$) to form the amide derivative. The replaceable hydrogen of the hydroxyl group is then substituted by a positive radical selected from the group consisting of aliphatic acyl radicals.

The plasticizers of this invention have the following general formulae:

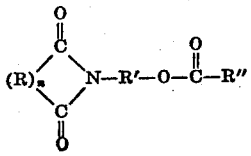

and

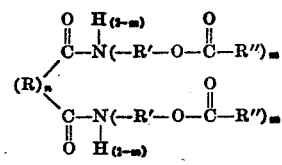

where
R is an aliphatic hydrocarbon chain,
$n$ is selected from the group consisting of 0 and 1,
R' is an alkylene hydrocarbon group,
—COR" is the residue of an aliphatic monocarboxylic acid having a chain of at least 3 carbom atoms, and
$m$ is selected from the group consisting of 1 and 2.

The ingredients employed in the formation of these plasticizers may be reacted in any order; however, it is generally preferable to form the hydroxy amide first and then form the desired derivatives by reacting with the desired acid.

The preparation and application of these novel plasticizers are illustrated in the following examples:

Example I

This example illustrates the preparation of one of the compounds disclosed herein.

One hundred pounds of succinic anhydride was placed in a reaction vessel and 35 gallons of toluene added. The toluene was heated to boiling and 61 pounds of monoethanolamine was added slowly and carefully. The reaction was violent and much heat was liberated. The solution was then refluxed for four hours during which period the following reaction occurred:

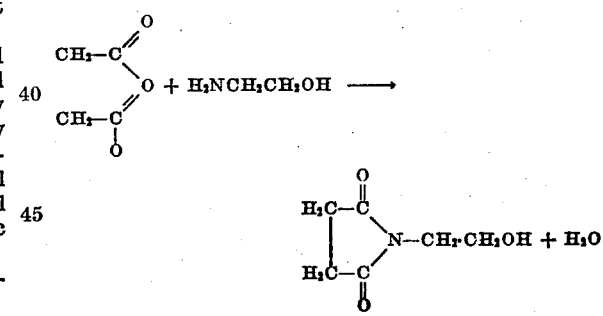

The water formed in the course of the reaction was continuously separated out.

Four pounds of 60° Bé. sulfuric acid together with 80 pounds of propionic acid was then added to the solution. Refluxing was resumed to bring about reaction of the N-hydroxy ethyl succinimide with the propionic acid.

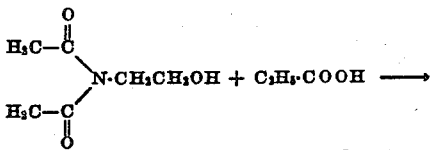

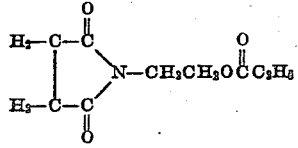

Succinimide ethyl propionate

After esterification was complete, the mixture was cooled. The toluene solution was washed with an aqueous carbonate solution until free of acid. The toluene was distilled, leaving the ester which may be purified further if desired. The yield was 85% of the theoretical.

*Example II*

One hundred forty six pounds of adipic acid was added to 122 pounds of monoethanolamine. Heat was evolved and a viscous material resulted. On cooling, crystals of dihydroxy ethyl ammonium adipate were formed, (this salt is changed to the diamide by heat alone or by boiling toluene).

One hundred gallons of toluene was added and the toluene boiled under reflux condenser with water trap until all of the water was removed.

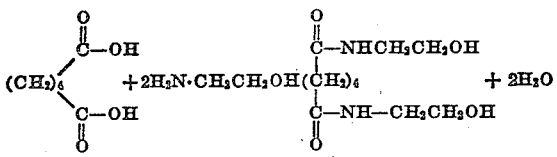

Four pounds of sulfuric acid and 165 pounds of propionic acid was then added to the toluene and boiling continued until no more water was collected and the dipropionate was formed. It was isolated as described under Example 1. The yield was 80% of theoretical.

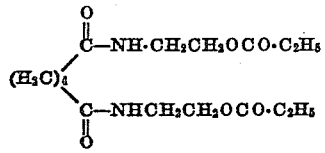

Adipamido diethyl propionate

*Example III*

A lacquer was prepared employing the following formulation:

| | Parts |
|---|---|
| Cellulose acetate | 20 |
| Adipamido diethyl propionate | 10 |
| Synthetic resin of phenol formaldehyde type | 25 |
| Acetone | 100 |
| Alcohol | 20 |
| Benzene | 50 |
| Diacetone alcohol | 30 |

This formulation gave a clear lacquer which remained stable indefinitely. The lacquer deposited hard glossy films which, upon flexible surfaces, showed no indication of cracking. The plasticizer did not bleed out of the film. Phthalimidoethyl formate, acetate, and benzoate when tested in this formulation tended to crystallize out of the coating film, forming a white crystalline layer upon its surface. This of course left the film unplasticized, in addition to detracting from its appearance.

*Example IV*

Moistureproofing coating compositions were prepared according to the following formulations:

| | Parts | | | | |
|---|---|---|---|---|---|
| | 1 | 2 | 3 | 4 | 5 |
| Nitrocellulose (5-6 sec.) | 43 | 30 | 50 | 40 | 45 |
| Adipamido diethyl propionate | 20 | 30 | 35 | 35 | 22 |
| Dibutyl phthalate | 10 | 5 | | | 7½ |
| Paraffin, M. P. 67° C | 5 | 5 | 4 | 4½ | 5 |
| Dammar gum | | 30 | | 20 | |
| Ester gum | 20 | | 10 | | 20 |
| Blown rapeseed oil | | | 1 | ½ | ½ |

These compositions were heat sealable or thermoplastic. The coating when tested upon regenerated cellulose film, was resistant to the passage of moisture vapor and was not tacky at room temperature.

For purposes of easy application, the compositions may be dissolved in solvents employing about 10 parts of the above composition in about 250 parts of solvent. A solvent mixture containing 15 parts ethyl acetate, 15 parts butyl acetate and 70 parts toluene has been found satisfactory. The solution may then be applied as a coating and dried in the usual way or formed into sheets or films.

*Example V*

A lacquer was prepared containing 100 parts of standard ethyl cellulose and 20 parts of adipamido dibutyl propionate. Films of this were colorless, clear, hard and glossy, and provided an excellent hard waterproofing finish on paper or cloth.

*Example VI*

A composition was prepared comprising 67.5% of high viscosity ethyl cellulose, 30.2% of adipamido diethyl butyrate and 2.3% of stearic acid. This composition was employed as an extruded coating for wire where it gave a tough, highly flexible, water-resistant coating having good electrical properties.

*Example VII*

Heat-sealable, non-tacky, moistureproof coating compositions applied in solution were prepared according to the following formulations:

| | Parts | | |
|---|---|---|---|
| | 1 | 2 | 3 |
| Nitrocellulose | 44 | 60 | 40 |
| Adipamido diethyl lactate | 35 | 25 | 35 |
| Dibutyl sebacate | 5 | 0.1 | 0.1 |
| Dewaxed dammar gum | 10 | 1 | 8 |
| Run copal | 1 | 10 | 10 |
| Blown rapeseed oil | 0.5 | 0.25 | 0.5 |
| Paraffin wax | 4.5 | 3.65 | 6.4 |

*Example VIII*

A coating composition was prepared containing the following ingredients dissolved in a solvent mixture containing 17% acetone, 10% ethyl acetate, 8% ethyl alcohol, 20% toluene, 22% monomethyl ether of ethylene glycol and 3% diacetone alcohol:

| | Parts |
|---|---|
| Cellulose acetate | 12 |
| Succinimide ethyl propionate | 6 |
| Diethyl phthalate | 4 |
| Solvent | 178 |

Example IX

A moistureproofing composition for regenerated cellulose film was prepared containing the following ingredients:

| | Parts |
|---|---|
| Nitrocellulose (5–6 sec.) | 9 |
| Urea-formaldehyde resin | 63 |
| Adipamido diethyl lactate | 14 |
| Hardening substance | 9 |

The composition was applied in solution (1% to 15% solids) to the pellicle and the coated pellicle was then subjected to an elevated temperature to evaporate the solvents and produce condensation of the urea resin to the insoluble stage. In addition to producing further condensation of the resins and evaporation of the solvent, the coating which was formed was firmly anchored to the pellicle to the extent that it was not affected by water even when immersed for a long period of time. During heating, the temperature was maintained at 77° C. to 99° C. for approximately two minutes. At lower temperatures the urea resin coating becomes partially resinified so that the top or second coating could be applied. On standing for some time, the urea resin coating automatically continued to condense to the insoluble stage.

The coating may be rendered moistureproof by adding 0.5% to 2% of paraffin without materially affecting the adherence of the coating to the base when immersed in water.

Although other methods of their preparation will be apparent to those skilled in the art, the plasticizers are, in general, prepared by reacting three substances: an aliphatic dicarboxylic acid or an anhydride, a hydroxy amine and a second organic acid of the aliphatic series. It is preferable to form the amido alcohol first; that is, to react the dicarboxylic acid and the hydroxy amine. The unreacted hydroxy groups on the amine are then reacted with the acid reagent.

Where one of the reactants is a solid, or where the reactants are immiscible, the reactions are best conducted in a liquid solvent medium. The solvent is then refluxed until reaction is complete. This, of course, necessitates the use of a solvent whose boiling point approximates the temperature at which amidation or esterification occurs. Toluene, o, -m or p, -xylene, n-decane and other high-boiling solvents may be used.

Typical acids which have been found satisfactory include oxalic, malonic, succinic, glutaric, adipic, pimelic, sebacic, and maleic.

The amino alcohols should have at least one amino group having one replaceable hydrogen. Tertiary amines are consequently inoperative in this invention since they are not capable of reacting with the carboxyl group of the acid. The aliphatic chain to which the amino group is attached, however, may be straight or branched and may contain one or more esterifiable hydroxy groups. Primary and secondary hydroxy amines which have been found suitable in the practice of this invention include ethanolamine, propanolamine, butanolamine, pentanolamine, hexanolamine, cyclohexyl - ethanolamine, isobutanolamine and laurylolamine; dihydroxy amines such as diethanolamine, 1,2,-dihydroxy-n-propylamine, 2,-4-dihydroxy butylamine, 2-amino, 1,-2,-dihydroxy, sec-butylamine, 2-hydroxy trimethylene diamine, 2-hydroxy hexamethylenediamine, 1-hydroxy butyl, 1-hydroxy ethyl amine. Similarly dihydroxy and trihydroxy amines may be employed.

The second acid may include any aliphatic mono carboxylic acid such as propionic acid, stearic acid, palmitic acid, butyric acid, caproic acid, caprylic acid, lauric acid, myristic acid, oleic acid, linoleic acid, linolenic acid, malic acid, lactic acid, pyruvic, acetoacetic, cyclohexanoic, and cyclopentanoic acids.

It will be understood that the anhydrides are equivalent to the acids themselves and may, in all cases, be employed in place of the acids, if desired.

The melting point and boiling point of the plasticizer obtained by the reaction of these ingredients will of course, be determined by the ingredients themselves. Consequently, a judicious selection of ingredients will lead to a plasticizer of any desired melting point. In general, it is preferable to employ a plasticizer whose melting point is below 65° C. Compounds of higher melting point show an undesirable tendency to crystalline out of certain compositions containing them. The plasticizers are insoluble in water. This property permits of their purification by washing in aqueous media, such as indicated in Examples I and II.

It is a significant advantage of the plasticizers of this invention that they are both esters and amides. They therefore possess solvent properties of both of these groups. This is an important factor, since many organic plastic compositions are readily soluble in esters, but are markedly less soluble in amides. With other organic plastics, the reverse is true. This makes the plasticizers of the present invention of wide application, particularly with mixed organic plastic materials.

The plasticizer of this invention may be employed to soften or increase the flexibility of the following resins and cellulose compounds, in proportion as great as 1:1, but generally in an amount up to 25% by weight of the resin or cellulose compounds, preferably between 5% and 10% by weight:

*Thermoplastic resins*

Polyvinyl chloride
Polyvinylidene chloride
Polystyrene
Copolymers of vinyl chloride and vinyl acetate
Copolymers of methyl methacrylate and vinyl chloride
Polyvinyl butyral
Polyvinyl acetal
Polymethyl methacrylate
Polymethyl acrylate
Polyethylene
Polyamides
Natural rubbers
Synthetic rubbers; chlorinated rubber
Polysulfides
Poly-isobutylenes, cyclized rubber, rubber hydrochloride
Buna rubber
Coumarone-indene with rubber
Oil-modified and unmodified alkyd resins prepared from dihydroxy alcohols and dicarboxylic acids.

Phenol-formaldehyde resins prepared from phenols having only two reactive positions

*Thermoplastic cellulose compounds*

Cellulose acetate
Cellulose acetate butyrate
Cellulose acetate propionate
Cellulose propionate
Benzyl cellulose
Ethyl cellulose
Butyl cellulose
Hydroxy ethyl cellulose

*Thermosetting resins*

Urea-formaldehyde
Phenol-formaldehyde (phenols having three reactive positions)
Melamine-formaldehyde
Alkyd resins prepared from polyhydric alcohols and polycarboxylic acids
Polystyrene and alkyd
Coumarone-indene and alkyd
Polyvinyl acetal and melamine-formaldehyde The resin or cellulose compound may be in any form such as a sheet, tube, or molding powder, and may or may not be combined with ingredients in addition to the plasticizer, as illustrated in the examples.

The plasticizers may also be employed in coating compositions and lacquers. A number of examples of such compositions containing the plasticizers of the invention have already been given.

While it is an advantage of the present plasticizers that they possess solvent powers for so many plastic components that they can normally be used as the only plasticizer, the invention is by no means limited to plastic compositions in which it is the only plasticizer present. On the contrary, it may be associated with other plasticizers such, for example, as dibutyl phthalate, dilauryl phthalate, cyclohexyl butyl phthalate, di-(methylcyclohexyl) phthalate, di-(dimethylcyclohexyl) adipate, dicyclohexyl adipate, tricresyl phosphate, esters of o-benzoyl benzoic acid such as butyl benzoyl benzoate, derivatives of toluene sulfonamide, or the like.

As moistureproofing agents, waxes or wax-like material such as paraffin, petrolatum, ceresin, japan wax, palm wax, beeswax, certain chlorinated hydrocarbons, Chinese insect wax, or other synthetic waxes or wax-like materials may be used. If some of these waxes are too soft for the purpose desired, they may be mixed with harder waxes of the group or with carnauba wax, candelilla wax or other harder waxes. Generally, paraffin serves as a satisfactory moistureproofing agent which may be hardened, if necessary, by admixture with carnauba wax or candelilla wax.

As the cellulose derivative, there may be used water soluble organic or solvent soluble cellulose ethers such as ethyl, or benzyl cellulose; cellulose esters such as cellulose nitrate, which is particularly useful; cellulose acetate, which is of limited compatibility; and such mixed esters or ether-esters as cellulose acetate-nitrate, cellulose acetate-propionate or ethyl cellulose-nitrate. These cellulose derivatives may be of various degrees of conversion as, for example, cellulose nitrates of various nitrogen contents.

In the preparation of moistureproofing coating compositions comprising a cellulose derivative and a moistureproofing agent, it is advantageous to include some material which will improve the compatibility of these two ingredients. This material is referred to as a blending agent and is usually of a resinous nature, although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained.

As the blending agents, any of the natural or synthetic resins commonly available may be used so long as they are compatible and form homogeneous mixtures. Such resins may include ester gum, resinates, hydrogenated rosin, hydrogenated rosin esters, dammar, copal, kauri, alkyd resins, vinyl derivatives, chlorinated diphenyl resins, and soluble resins of the phenol-formaldehyde type. Non-resinous blending agents may be used when they yield homogeneous mixtures, and these may include rapeseed oil, hydrogenated castor oil, castor oil phthalate, lanolin or wool grease, ethyl abietate, methyl abietate, diethylene glycol resinate, diethylene glycol hydroresinate, or the like.

It is most convenient to apply the above lacquer and moistureproofing coating compositions to base materials, such as sheets of regenerated cellulose, by means of suitable solvents. Thus, the film-forming ingredients may be dissolved to give a coating solution of an appropriate viscosity and solids content, whereupon the solution may be applied to the desired base in accordance with the methods known in the art. The solvents may be removed and the coated base subjected to an elevated temperature at least equal to the melting point of the wax, whence, after cooling, a clear, transparent, moistureproof, coated base will be obtained.

These moistureproofing compositions may be applied to various sheet materials to produce wrapping tissues which are flexible, moistureproof and heat-sealable and which exhibit highly improved surface characteristics including excellent surface slip and resistance to caking, sticking, or marring during storage. A variety of base sheet materials may be used, such as cellulosic materials, paper, albuminous materials (gelatin, agar-agar, casein), or films made from rubber derivatives, that is, rubber hydrochloride, chlorinated rubber, or the material prepared by reacting rubber and a metal halide such as boron trifluoride, stannous or stannic chloride, stannic acid, and other materials. In the preferred embodiment of the invention, a non-porous, non-fibrous, dense, smooth surfaced, and preferably transparent material such as regenerated cellulose is employed.

In the coating compositions set forth in the above examples it is apparent that the proportions of the several ingredients may be varied over a considerable range. Thus, the resin, cellulose derivative or its equivalent may comprise 40% to 65% or more of the total solids, although in most instances 50% to 60% will be found most satisfactory, with approximately 55% a convenient and generally useful proportion. The ratio of cellulose derivative or resin to blending agent may vary over a wide range. The cellulose derivative is usually in excess of the total plasticizer content, and the ratio of cellulose derivative to plasticizer may vary from 1:1 to 3:1, but a ratio of 1.5:1 to 3:1 is generally found to give the best results.

The total plasticizer concentration may vary from 15% to 45% of the total solids. Low percentages of plasticizer, however, are usually used only when the blending agent is capable of exerting a plasticizing action and can therefore be added. Among the objects of the invention is the production of highly moistureproof and heat-sealable coating compositions, and for the accomplishment of this object it is usually necessary to use relatively large amount of plasticizer. When the total plasticizer comprises substances other than hereinbefore described, such for example, as dibutyl phthalate or a plasticizing blending agent, it is preferable that the imido or amido ester predominate. Usually, 50% or more the total plasticizer should be provided by these substances, although as little as 25%, or even less, may be used with certain plasticizers without completely eliminating the unique properties of these specific plasticizers.

Though the moistureproofing compositions have been described specifically for coating, it is to be understood that they may also be cast in any known manner to produce self-sustaining, flexible, transparent, moistureproof and heat-sealable film which exhibits highly improved surface characteristics, including excellent surface slip and resistance to caking, sticking or marring during storage.

Where percentage and proportions are referred to throughout the specification, they represent parts by weight, unless otherwise indicated.

Other compounds of the present invention may have many and varied uses; for example, in the textile industries they may be used as delusterants, lubricants, fillers, wetting assistants, masking agents, and waterproofing agents, softeners, and plasticizers; in the lacquer industries as fillers, thickeners, plasticizers and moistureproofing and slip reducing agents; in the adhesive industries as softeners, plasticizers, body-producing agents, blenders, and tack-producing and controlling agents; in the mechanical industries as lubricants, pour depressants for other lubricants, and for cooling liquids.

This application is a continuation-in-part of application for United States Letters Patent Serial Number 420,857 (abandoned), filed November 28, 1941, to Ralph T. K. Cornwell.

I claim:

1. A composition of matter comprising an organic film-forming material, selected from the group consisting of thermoplastic and thermosetting materials which need plasticizing and are capable of forming waterproofing and heat-sealing compositions, plasticized with a water-insoluble product distributed throughout the material selected from the group consisting of compounds having the formulae:

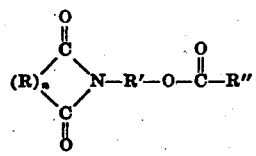

and

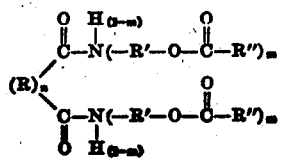

where

R is an aliphatic hydrocarbon chain,
$n$ is selected from the group consisting of 0 and 1,
R' is an alkylene hydrocarbon group,
—COR" is the residue of an aliphatic monocarboxylic acid having a chain of at least three carbon atoms, and
$m$ is selected from the group consisting of 1 and 2, the plasticizer being present in an amount from 5% to 100% by weight of the film-forming material.

2. The composition of claim 1 in which R" is an ethyl group.

3. The composition of claim 1 in which R" is a propyl group.

4. The composition of claim 1 in which R" is $CH_3CHOH$.

5. The composition of claim 1 in which $(R)_n$ is $(CH_2)_2$.

6. The composition of claim 1 in which $(R)_n$ is $(CH_2)_4$.

7. The composition of claim 1 in which R' is $C_2H_4$ and $m$ is 1.

8. The composition of claim 1 in which R' is $C_4H_8$ and $m$ is 1.

9. A composition of matter in accordance with claim 1 in which the film-forming base is a cellulose derivative.

10. A composition of matter in accordance with claim 1 in which the film-forming base is a synthetic resin.

11. A composition of matter capable of being molded and of being cast into films, sheets and other articles comprising an organic film-forming material, selected from the group consisting of thermoplastic and thermosetting materials which need plasticizing and are capable of forming waterproofing and heat-sealing compositions, plasticized with succinimide ethyl propionate, the plasticizer being present in an amount from 5% to 100% by weight of the film-forming material.

12. A composition of matter capable of being molded and of being cast into films, sheets and other articles comprising an organic film-forming material, selected from the group consisting of thermoplastic and thermosetting materials which need plasticizing and are capable of forming waterproofing and heat-sealing compositions, plasticized with adipamidodiethyl propionate, the plasticizer being present in an amount from 5% to 100% by weight of the film-forming material.

13. A composition of matter capable of being molded and of being cast into films, sheets and other articles comprising an organic film-forming material, selected from the group consisting of thermoplastic and thermosetting materials which need plasticizing and are capable of forming waterproofing and heat-sealing compositions, plasticized with adipamido dibutyl propionate, the plasticizer being present in an amount from 5% to 100% by weight of the film-forming material.

RALPH THOMAS KLINE CORNWELL.

REFERENCES CITED

The following references are of record in the file of this patent:

UNITED STATES PATENTS

| Number | Name | Date |
|---|---|---|
| 2,238,901 | Katzman et al. | Apr. 22, 1941 |
| 2,238,902 | Katzman et al. | Apr. 22, 1941 |